US011877132B2

(12) United States Patent
Kawka et al.

(10) Patent No.: US 11,877,132 B2
(45) Date of Patent: *Jan. 16, 2024

(54) MICRO TRANSDUCER MOLDING

(71) Applicant: Bose Corporation, Framingham, MA (US)

(72) Inventors: Marek Kawka, Bolton, MA (US); Alexander Irwin, Belmont, MA (US); Martha Carman, Arlington, MA (US); Timothy M. Parker, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,971

(22) Filed: Feb. 15, 2023

(65) Prior Publication Data
US 2023/0199416 A1   Jun. 22, 2023

Related U.S. Application Data

(63) Continuation of application No. 17/207,083, filed on Mar. 19, 2021, now Pat. No. 11,601,770.

(60) Provisional application No. 62/992,583, filed on Mar. 20, 2020.

(51) Int. Cl.
H04R 31/00 (2006.01)
B29C 45/26 (2006.01)
B29C 45/14 (2006.01)
H04R 7/12 (2006.01)
B29L 31/38 (2006.01)

(52) U.S. Cl.
CPC ..... *H04R 31/003* (2013.01); *B29C 45/14491* (2013.01); *B29C 45/26* (2013.01); *H04R 7/127* (2013.01); *B29L 2031/38* (2013.01); *H04R 2231/001* (2013.01); *H04R 2231/003* (2013.01); *H04R 2307/025* (2013.01)

(58) Field of Classification Search
CPC .............. H04R 31/003; H04R 7/127; H04R 2231/001; H04R 2231/003; H04R 2307/025; H04R 7/18; H04R 7/20; B29K 2995/0001; B29C 45/14491; B29C 45/26; B29C 45/14; B29C 45/14467; B29C 2045/0094; B29L 2031/38; B23P 15/00; Y10T 29/4998; Y10T 29/49982; Y10T 29/49984; Y10T 29/49993
See application file for complete search history.

(56) References Cited

U.S. PATENT DOCUMENTS

2012/0160598 A1* 6/2012 Silver .................. H04R 7/20
181/172

FOREIGN PATENT DOCUMENTS

EP    3591995 A1 *  1/2020  ............. H04R 31/00

* cited by examiner

Primary Examiner — Mark Fischer

(57) ABSTRACT

Articles and methods are provided for miniature acoustic transducers having highly compliant suspension systems despite their small size. In various examples the suspension system is molded of a liquid silicone rubber (LSR) and is molded in an interior cavity geometry that includes and apex radially offset and/or axially offset from a desired cured position of an apex of the suspension.

20 Claims, 2 Drawing Sheets

MICRO TRANSDUCER MOLDING

CROSS REFERENCE TO RELATED APPLICATIONS

This application is a continuation of U.S. patent application Ser. No. 17/207,083, filed on Mar. 19, 2021, titled MICRO TRANSDUCER MOLDING, which further claimed the benefit of provisional U.S. Patent Application Ser. No. 62/992,583, filed on Mar. 20, 2020, titled MICRO TRANSDUCER MOLDING, the contents of each of which is incorporated herein in their entirety for all purposes.

BACKGROUND

This disclosure relates to an electro-acoustic transducer, and in various examples relates to a miniature electro-acoustic transducer including a diaphragm having a compliant suspension/surround.

SUMMARY

Systems and methods disclosed herein are directed to miniature electro-acoustic transducers having small diaphragms, such as those having diameters of 8.0 mm or less, diameters of 5.5 mm or less, or diameters of 4.2 mm or less, in various examples, suspended by high-compliance suspension systems. The suspension system may be a surround formed of a highly compliant material that may be injection molded to attach or suspend the diaphragm within a frame. In some examples, an overall width of miniature electro-acoustic transducers, e.g., a width of the frame, in accord with those herein may be 3.0 mm or less, may be 4.2 mm or less, 5.5 mm or less, or 8.0 mm or less.

According to various examples, diaphragms in accord with those herein may be comprised of a central piston, the suspension, and the frame. In some examples, the central piston and/or the frame may be constructed of a thermoplastic materials, such as a Nylon and/or Glass Fiber combination. In some examples, either of the frame or the piston may be constructed of Nylon 9T (a.k.a. Polyamide 9T).

In various examples, the suspension (also called a surround) may be formed of a liquid silicone rubber (LSR), or other suitably compliant material, of durometer less than 70 shore A, and preferably less than 50 Shore A. In some examples, the durometer of the surround material may be between 20 Shore A and 40 Shore A, and in certain examples may be about 30 Shore A.

In various examples, a thickness of the surround material may be in a range of 10 to 100 μm, and may be less than 50 μm, and in some examples may be in the range of 20-30 μm, and in certain examples may be about 25 μm. In various examples, the diaphragm may be 5.5 mm or less in diameter, and in some examples may be about 5.2 mm or less, and in certain examples may be about 4 mm or less. In various examples, the suspension may result in the piston and suspension assembly having an axial stiffness at a rest position of 50 N/m or less. In some examples the axial stiffness may be 35 N/m or less, and in certain examples may be 25 N/m or less. In certain examples the axial stiffness may be in the range of about 8-30 N/m or may be in the range of about 5-15 N/m. By axial stiffness is meant an amount of force required to move the piston axially, e.g., perpendicular to a surface of the piston and/or perpendicular to a plane of the surround, an amount of distance from a rest position. This axial stiffness may increase as the piston moves further from the rest position, but references to axial stiffness herein refer to the force-to-distance ratio at or very near the rest position, e.g., before excursion away from the rest position increases the force required, such as excursion amounts that do not stretch the suspension system, for example.

According to various aspects, a method of forming an acoustic transducer is provided that includes providing a mold having an interior cavity geometry with at least one of a radial offset or an axial offset from a desired geometry of the suspension and injecting a compliant material into the mold.

Various examples also include providing a piston at a first position relative to the mold, providing a frame at a second position relative to the mold, and wherein injecting the compliant material into the mold causes the compliant material to contact each of the piston and the frame. In some examples, the compliant material at least partially adheres to each of the piston and the frame, such that upon removal from the mold the compliant material suspends the piston relative to the frame.

According to some examples, an outer edge of the interior cavity geometry of the mold defines a geometrically closed shape having a largest linear dimension less than 8 millimeters. In various examples the largest linear dimension is 5.5 mm or less. In various examples the geometrically closed shape may be a circle.

In certain examples at least one of the radial offset is in a range of about 20 micrometers (μm) to 110 μm and the axial offset is in a range of about 20 μm to 130 μm.

According to other aspects, an acoustic transducer is provided that includes a frame having a largest linear dimension of 8.0 millimeters or less, a suspension formed of a compliant material coupled to the frame, and a piston coupled to and suspended by the suspension, such that the piston is suspended within the frame and the piston when in an at-rest position reacts to an applied force with a stiffness in a range of 5 to 50 Newtons per meter (N/m).

According to some examples, the suspension may be formed by providing a mold having an interior cavity geometry with at least one of a radial offset or an axial offset from a desired geometry of the suspension and injecting the compliant material into the mold.

According to various examples, injecting the compliant material into the mold causes the compliant material to contact each of the piston and the frame.

In certain examples, the compliant material at least partially adheres to each of the piston and the frame, such that upon removal from the mold the compliant material suspends the piston relative to the frame.

In some examples, an outer edge of the interior cavity geometry of the mold defines a geometrically closed shape having a largest linear dimension of 5.5 millimeters or less. In certain examples the geometrically closed shape may be a circle.

According to certain examples, at least one of the radial offset is in a range of about 20 micrometers (μm) to 110 μm and the axial offset is in a range of about 20 μm to 130 μm.

According to another aspect, a mold is provided that includes an interior cavity having an interior geometry including at least one of a radial offset or an axial offset from a desired geometry of a transducer suspension, and an inlet to allow a compliant material to be injected in the interior cavity.

According to some examples, at least one of the radial offset is in a range of about 20 micrometers (μm) to 110 μm and the axial offset is in a range of about 20 μm to 130 μm.

According to various examples, an outer edge of the interior geometry of the mold defines a geometrically closed shape having a largest linear dimension of 8.0 millimeters or less. In certain examples the geometrically closed shape may be a circle.

In various examples, the mold includes one or more allowances to engage at least one of a piston and a frame such that the compliant material, when injected in the interior cavity, contacts the at least one of the piston and the frame. In certain examples the compliant material at least partially adheres to each of the at least one of the piston and the frame, such that upon removal from the mold the compliant material suspends the piston relative to the frame.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
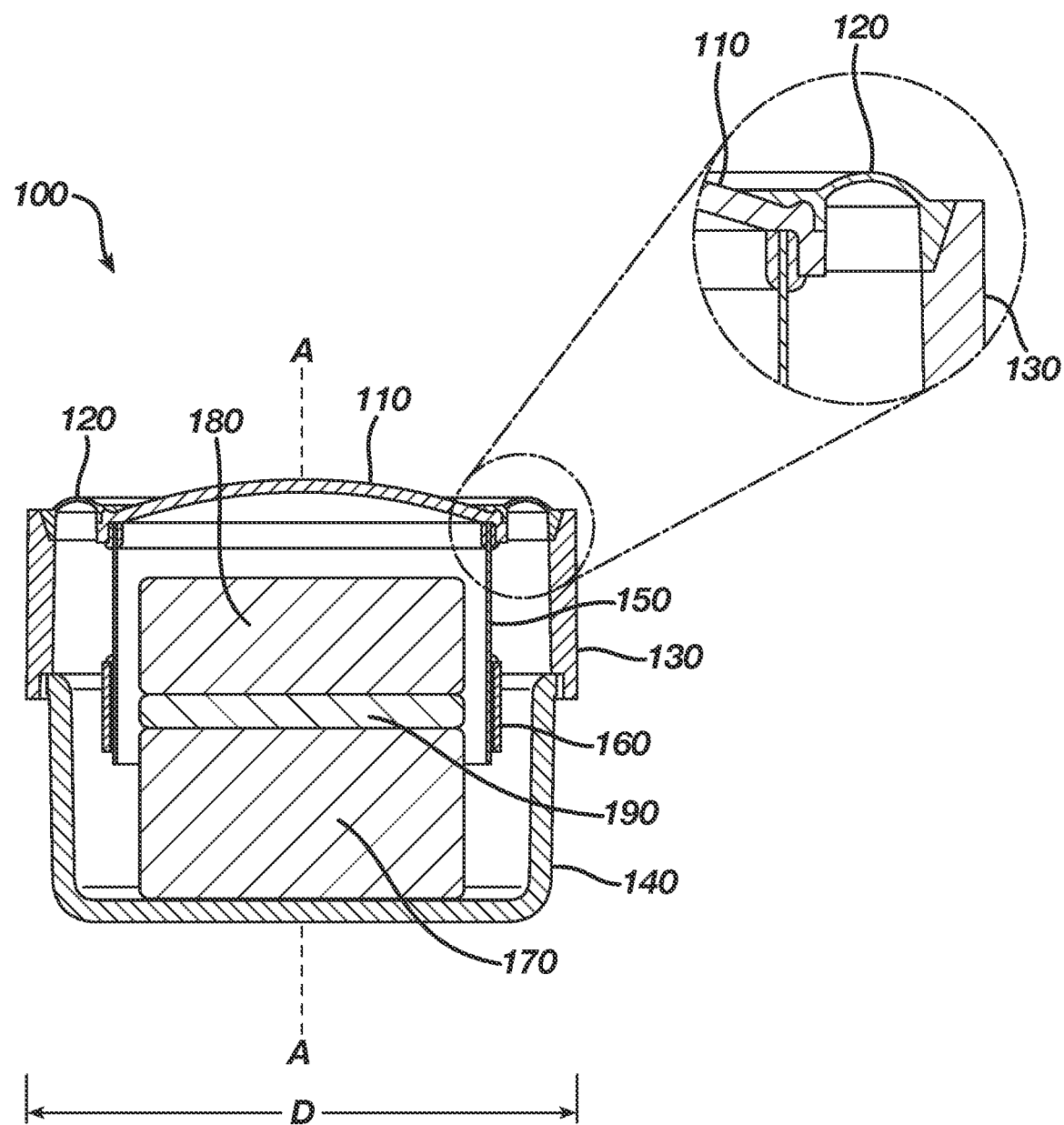
FIG. 1 is a schematic diagram of an example miniature transducer in accord with examples described herein.

Modern in-ear headphones, or earbuds, typically include microspeakers, which are miniature electro-acoustic transducers. A microspeaker may include a voice coil positioned in a magnetic field and mechanically coupled to an acoustic diaphragm. An electrical signal provided to the voice coil results in motion of the diaphragm—and a piston or acoustically radiating surface thereof—thereby generating an acoustic signal responsive to the electrical signal. The microspeaker may include a frame from which the piston is suspended by a suspension or surround, and may include a housing that encloses the voice coil and a magnetic structure or circuit. As the size of earbuds decrease, it becomes increasingly difficult to fabricate an acoustic diaphragm with a surround suspension in a manner that allows broad spectrum coverage. Examples of microspeakers described herein include a highly compliant (low stiffness) surround or suspension, as compared to conventional microspeakers. At least one benefit of such high-compliance transducers includes broader spectral output than conventional microspeakers, e.g., higher acoustic displacement and output power across a larger range of frequencies as compared to conventional designs.

In general, in one aspect, an electro-acoustic transducer includes a piston having a front surface, a back surface, and a perimeter; a bobbin coupled to the piston; and a suspension (surround) coupled to the piston and frame. The bobbin may be configured to hold a winding of an electrical conductor (e.g., a voice coil). A motion of the bobbin along the bobbin axis generates a movement of the piston to thereby generate an acoustic signal that propagates from the front surface of the piston. In some examples, the voice coil may be more directly coupled to the piston, without a bobbin. The suspension provides a high compliance given the overall dimensional scale of the transducer. In some instances, the term diaphragm may be intended to refer to the piston and/or the overall acoustically radiating surface (such as may include the front surface of the piston and a portion of the suspension). In other instances, the term diaphragm may be intended to refer to a diaphragm assembly comprised of the piston, surround, and frame.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, component, elements, and features discussed in connection with any one or more examples are not intended to be excluded from a similar role in any other examples.

Examples disclosed herein may be combined with outer examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an example transducer 100 in cross-sectional view having a piston 110 supported by a suspension 120 that is further coupled to a frame 130. The frame 130 forms a support structure in which the piston 110 is suspended by the suspension 120. In various examples, the frame 130 may be coupled to a cup 140, which in combination with the frame 130, suspension 120, and piston 110 may form an enclosed volume. Further in various examples, a bobbin 150 may be mechanically coupled to the piston 110 and may support a voice coil 160. The voice coil 160 may be positioned in a magnetic field that may be created by a primary magnet 170 in some examples. When electrical current is passed through the voice coil 160, it generates a further magnetic field that interacts with the magnetic field of the primary magnet 170 and creates a force in an axial direction, A, that is passed via the bobbin 150 to the piston 110, which moves in response and thereby converts electrical energy into acoustic energy in the air, as known in the art. In some but not all examples, the magnetic field may be further shaped and/or strengthened by a secondary magnet 180 and/or a coin 190. The structure of the illustrated example transducer 100 is merely an example and numerous other structures may be suitable without departing from the inventive systems and methods described herein.

Methods and apparatuses described herein are directed to the manufacture and form of the suspension 120. The piston 110 and the frame 130 form the immediate environment of the suspension 120 and may take any of numerous forms. The combination of a piston 110, the suspension 120, and the frame 130 may be referred to herein as an assembly or a diaphragm (or a diaphragm assembly). The suspension 120 allows the piston 110 to move in response to force from the voice coil 160. The amount of force required to move the piston 110 a given distance in the axial direction, A, from a nominal or at-rest position, is a stiffness of the suspension 120 (or of the assembly). In various examples, the axial stiffness may be 50 Newtons per meter (N/m) or less. In some examples, the axial stiffness may be 35 N/m or less or may be 25 N/m or less. In certain examples the axial stiffness may be in a range of about 8-30 N/m or may be in a range of about 5-15 N/m.

In various examples, the transducers described herein may have a total diameter, D, (or in some cases a diaphragm diameter) of 8.0 millimeters (mm) or less, 5.5 mm or less, and in certain examples may be about 4 mm or less.

While the piston 110 is shown as a curved or dome structure, in various examples, the piston 110 may be a substantially planar structure. Additionally, the piston 110, as illustrated, is a rigid structure having an exposed outer or front surface. The front surface is the air interface from which acoustic energy is emitted in operation. In general, the term diaphragm may refer to that portion of a transducer in contact with a fluid, e.g., air, that moves against the fluid causing pressure waves to be generated in the fluid. In various examples, the piston 110 as illustrated may be covered or coated in another material, and the face of such material may technically be the 'diaphragm' by the above definition, without departing from the examples described herein. For example, in some instances, the material from which the suspension 120 is formed may extend over the surface of the piston 110.

While FIG. 1 illustrates a bobbin 150, various examples may not include a bobbin and may have alternate forms of coupling the voice coil 160 to the piston 110 or the diaphragm assembly.

In various examples, the suspension 120 is formed of a soft compliant material. In various examples, the suspension material may be between 20 Shore A and 40 Shore A, and in certain examples may be about 30 Shore A.

Figure 2A:
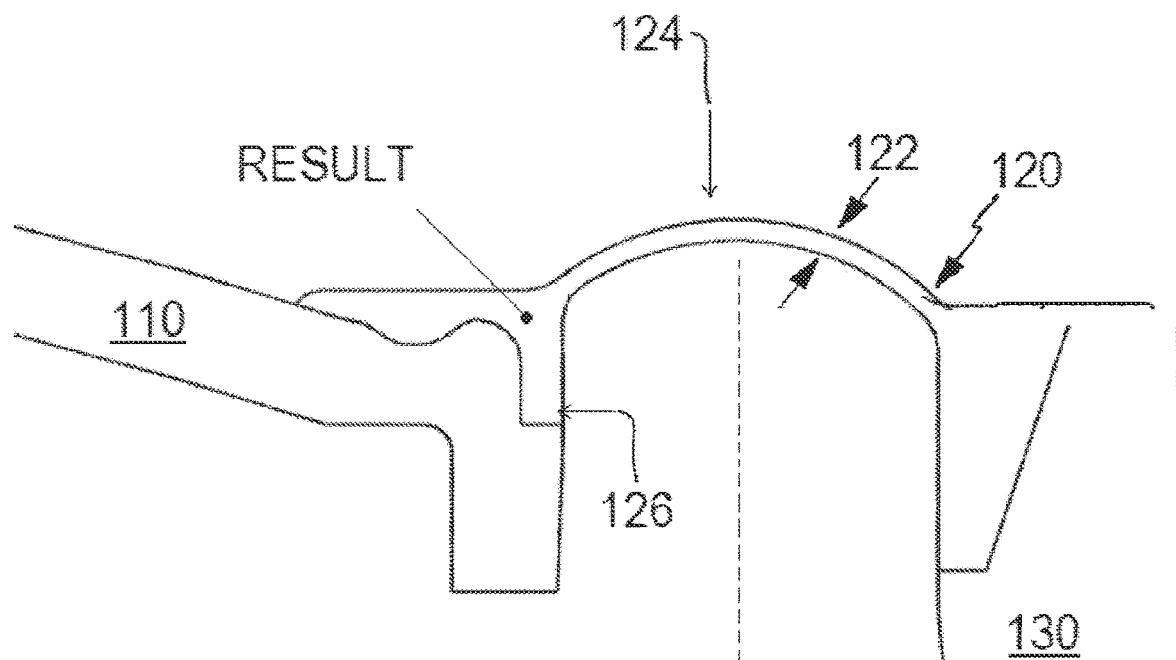
FIG. 2A is a schematic diagram illustrating an example surround component of the miniature transducer of FIG. 1.

FIG. 2A illustrates a close-up cross-sectional view of the assembly of the piston 110, suspension 120, and frame 130. The suspension 120 has a thickness 122 that may be in a range of 10 to 100 micrometers (μm), and may be less than 70 μm or less than 50 μm, and in various examples may be less than 40 μm, and in some examples may be in the range of 20-30 μm, and in certain examples may be about 25 μm.

Figure 2B:
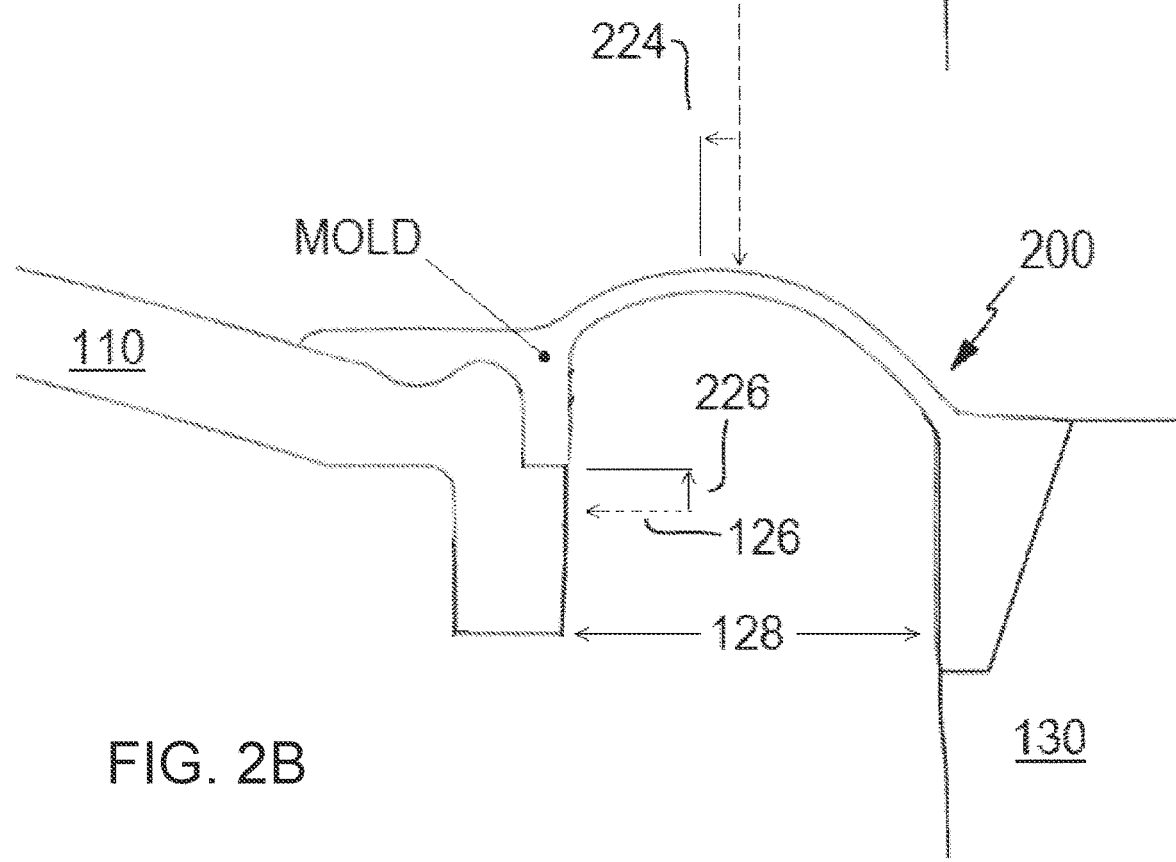
FIG. 2B is a schematic diagram illustrating an example mold geometry to produce the example surround component of FIG. 2A.

In certain examples, the suspension 120 may be formed by injection molding. In various examples, the suspension 120 may be formed from liquid silicone rubber (LSR) or other suitable compliant material. Such materials, including LSR, may shrink during curing. At the scale or physical size of the miniature transducers and compliant suspension materials as described herein, the suspension 120 may shrink in various non-proportional manners. Accordingly, the forming of the suspension 120 in accord with methods and examples described herein accommodates non-proportional shrinkage of the compliant material of the suspension 120 at the physical dimensions of the suspension 120. Accordingly, a mold cavity 200 is illustrated in FIG. 2B from which the example suspension 120 may be produced. The mold cavity 200 has an interior geometry that matches a shape of the pre-cured suspension material to be formed, such that a properly shaped suspension 120 will result after curing, drying, shrinking, etc.

FIG. 2A includes two reference positions defined by the intended resulting shape of the suspension 120, an apex 124 at the highest point of a "half-roll" of the suspension 120 and a reference 126 at an arbitrary axial position. The mold cavity 200 is shaped such that one or more of these positions are at different locations than the resulting suspension 120. It should be noted that the term "half-roll" is primarily intended to refer to a non-planar (e.g., non-flat) shape of the suspension 120 and is not intended to mean that the resulting shape necessarily has a semi-circular cross-section.

In various examples, the interior geometry of the mold cavity 200 has an apex having a radial offset 224 from the apex 124 of the suspension 120. In certain examples, the offset 224 may be such that the apex of the mold cavity 200 is closer to the piston 110, e.g., closer to the center of the transducer, than the apex 124.

In some examples, the radial offset 224 may be 10 μm or greater. In some examples the radial offset 224 may be in a range of about 20 μm to 60 μm. In some examples the radial offset 224 may be in a range of about 20 μm to 130 μm. In certain examples, the radial offset 224 may be about 40 μm, 70 μm, or 110 μm. In various examples, the radial offset 224 may represent a shift of the mold apex (relative to the apex 124 of the resulting suspension 120) defined as a fraction or percentage of a span 128 (or gap) over which the suspension 120 extends. In various examples the radial offset 224 may be 5% to 30% of the span 128. In some examples the radial offset 224 may be 18% to 30% of the span 128.

In various examples, the span 128 may be about 500 μm or less. In some examples, the span 128 may be about 430 μm or less. In some examples, the span 128 may be a fraction of the diameter, D, of FIG. 1, of about 5-15%. In certain examples, the span 128 may be about 7 to 13% of the diameter, D, and in more specific examples the span 128 may be 8 to 12% of the diameter, D.

In various examples, the interior geometry of the mold cavity 200 includes an axial offset 226 such that while molding the suspension 120, the piston 110 is held in a position axially offset from its at-rest position (e.g., relative to the frame 130). In various examples, the axial offset 226 may be 25 μm or greater. In some examples the axial offset 226 may be in a range of about 50 μm to 130 μm. In certain examples, the axial offset 226 may be in a range of about 70 μm to 120 μm. According to some aspects, various examples may have an axial offset 226 of 20 μm to 60 μm, or 30 μm to 60 μm, and may be in a range of 40 to 50 μm. In certain examples, the suspension 120 of a miniature transducer having diameter, D, of about 4.2 mm may be manufactured by a mold cavity 200 having an axial offset of about 40 to 50 μm.

After molding according to the mold cavity 200 as described herein, the resulting suspension 120 after shrinking from the mold may have a desired shape, e.g., according to FIG. 1 and as further illustrated in FIG. 2A. While not expressly shown in the figures, the mold cavity 200 may include an inlet or nozzle through which the compliant material may be introduced or injected into the mold cavity 200.

Having described above several aspects of at least one example, it is to be appreciated various alternations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims and their equivalents.

What is claimed is:

1. An acoustic transducer comprising:
   a frame having a diameter of 8.0 millimeters or less;
   a non-planar suspension formed of a compliant material coupled to the frame, the suspension being formed by injecting the compliant material into a mold having an interior cavity geometry with an apex positioned to be radially offset or axially offset from a desired cured position of the apex of the suspension; and
   a diaphragm coupled to and suspended by the suspension, such that the diaphragm is suspended within the frame.

2. The acoustic transducer of claim 1 wherein the suspension provides a stiffness such that the diaphragm reacts to an applied force in a range of 5 to 50 Newtons per meter (N/m).

3. The acoustic transducer of claim 1 wherein the suspension provides a stiffness such that the diaphragm reacts to an applied force by 35 N/m or less.

4. The acoustic transducer of claim 3 wherein the diameter is 5.5 mm or less.

5. The acoustic transducer of claim 1 wherein the suspension provides a stiffness such that the diaphragm reacts to an applied force by 25 N/m or less.

6. The acoustic transducer of claim 5 wherein the diameter is 4.2 mm or less.

7. The acoustic transducer of claim 1 wherein the compliant material at least partially adheres to each of the diaphragm and the frame and is formed by providing the diaphragm at a first position relative to the mold, providing the frame at a second position relative to the mold, and injecting the compliant material into the mold, causing the compliant material to contact each of the diaphragm and the frame.

8. The acoustic transducer of claim 1 wherein the diameter is 5.5 mm or less.

9. The acoustic transducer of claim 1 wherein the diameter is 4.2 mm or less.

10. The acoustic transducer of claim 1 wherein at least one of the radial offset is in a range of about 20 micrometers (μm) to 110 μm or the axial offset is in a range of about 20 μm to 130 μm.

11. An acoustic transducer comprising:
    a circular frame having a diameter of 8.0 millimeters or less;
    a half-roll suspension having a substantially semi-circular cross-section formed of a compliant material coupled to the frame, the suspension being formed by injecting the compliant material into a mold having an interior cavity geometry with an apex positioned to be radially offset or axially offset from a desired cured position of the apex of the suspension; and
    a diaphragm coupled to and suspended by the suspension, such that the diaphragm is suspended within the frame.

12. The acoustic transducer of claim 11 wherein the suspension provides a stiffness such that the diaphragm reacts to an applied force in a range of 5 to 50 Newtons per meter (N/m).

13. The acoustic transducer of claim 11 wherein the suspension provides a stiffness such that the diaphragm reacts to an applied force by 35 N/m or less.

14. The acoustic transducer of claim 13 wherein the diameter is 5.5 mm or less.

15. The acoustic transducer of claim 11 wherein the suspension provides a stiffness such that the diaphragm reacts to an applied force by 25 N/m or less.

16. The acoustic transducer of claim 15 wherein the diameter is 4.2 mm or less.

17. The acoustic transducer of claim 11 wherein the compliant material at least partially adheres to each of the diaphragm and the frame and is formed by providing the diaphragm at a first position relative to the mold, providing the frame at a second position relative to the mold, and injecting the compliant material into the mold, causing the compliant material to contact each of the diaphragm and the frame.

18. The acoustic transducer of claim 11 wherein the diameter is 5.5 mm or less.

19. The acoustic transducer of claim 11 wherein the diameter is 4.2 mm or less.

20. The acoustic transducer of claim 11 wherein at least one of the radial offset is in a range of about 20 micrometers (μm) to 110 μm or the axial offset is in a range of about 20 μm to 130 μm.

* * * * *